(12) United States Patent
Shubs, Jr.

(10) Patent No.: US 9,711,046 B2
(45) Date of Patent: Jul. 18, 2017

(54) TRAIN STATUS PRESENTATION BASED ON AGGREGATED TRACKING INFORMATION

(71) Applicant: Electro-Motive Diesel, Inc., Lagrange, IL (US)

(72) Inventor: Alexander Shubs, Jr., Chicago, IL (US)

( * ) Notice: Subject to any disclaimer, the term of this patent is extended or adjusted under 35 U.S.C. 154(b) by 0 days.

(21) Appl. No.: 14/947,483

(22) Filed: Nov. 20, 2015

(65) Prior Publication Data

US 2017/0148323 A1   May 25, 2017

(51) Int. Cl.
   *G05D 1/00* (2006.01)
   *B61L 3/22* (2006.01)
   (Continued)

(52) U.S. Cl.
   CPC .................. *G08G 1/13* (2013.01); *B61L 3/08* (2013.01); *B61L 25/02* (2013.01);
   (Continued)

(58) Field of Classification Search
   USPC .............................................. 701/19; 246/15
   See application file for complete search history.

(56) References Cited

U.S. PATENT DOCUMENTS

| 4,896,580 A | 1/1990 | Rudnicki | |
| 6,853,890 B1 * | 2/2005 | Horst | B61C 17/12 246/187 A |

(Continued)

FOREIGN PATENT DOCUMENTS

| GB | 2381299 | 4/2003 |
| WO | WO 98/37432 | 8/1998 |

*Primary Examiner* — Thomas G Black
*Assistant Examiner* — Tyler Paige
(74) *Attorney, Agent, or Firm* — Finnegan, Henderson, Farabow, Garrett & Dunner, LLP

(57) ABSTRACT

A control system presents a configurable virtual representation of at least a portion of a train and associated train assets, including a real-time location, configuration, and operational status of the train and associated train assets traveling along a railway. The control system may include a train position determining system, and a train configuration determining system. The control system may further include a train asset operational parameter sensing device, and a controller configured to receive data produced by the train position determining system, the train configuration determining system, and the train asset operational parameter sensing device. The controller may also process and aggregate the received data to provide a real-time virtual representation of the train and the train assets including the actual real-time position and configuration of the train assets relative to each other and to a geographical location, and coordinate a presentation of the aggregated data such that implementation of a select presentation process to the aggregated data results in a simultaneous implementation of the same select presentation process to at least one of electronic map data associated with the real-time location of the train and the train asset operational parameter data. A graphical user interface (GUI) may be configured to display in one or more display areas the real-time virtual representation of the train including a coordinated and configurable presentation of at least a portion of the aggregated data and the train asset operational parameter data.

20 Claims, 5 Drawing Sheets

(51) Int. Cl.
*G08G 1/13* (2006.01)
*B61L 3/08* (2006.01)
*B61L 25/02* (2006.01)
*B61L 27/00* (2006.01)
*G06F 3/0484* (2013.01)
*G06F 3/0482* (2013.01)

(52) U.S. Cl.
CPC ........ B61L 27/0011 (2013.01); *G06F 3/0482* (2013.01); *G06F 3/04847* (2013.01)

(56) References Cited

U.S. PATENT DOCUMENTS

| | | | |
|---|---|---|---|
| 7,729,818 B2 | 6/2010 | Wheeler et al. | |
| 7,783,507 B2 | 8/2010 | Schick et al. | |
| 7,826,938 B2 | 11/2010 | Kato et al. | |
| 7,974,774 B2 | 7/2011 | Kumar | |
| 8,150,568 B1 | 4/2012 | Gray | |
| 8,583,299 B2 | 11/2013 | Goodermuth et al. | |
| 8,979,363 B2 | 3/2015 | Groeneweg et al. | |
| 8,989,917 B2 | 3/2015 | Kumar | |
| 2006/0138285 A1* | 6/2006 | Oleski | B61L 25/025 246/167 R |
| 2007/0060984 A1* | 3/2007 | Webb | A61N 5/0601 607/89 |
| 2007/0219680 A1 | 9/2007 | Kumar et al. | |
| 2009/0173839 A1* | 7/2009 | Groeneweg | B61L 23/042 246/15 |
| 2010/0097239 A1* | 4/2010 | Campbell | B60R 11/0252 340/4.4 |
| 2011/0093110 A1* | 4/2011 | Stencel | B25B 21/00 700/110 |
| 2013/0083011 A1* | 4/2013 | Geisner | G09G 5/00 345/419 |
| 2015/0088345 A1 | 3/2015 | Nandedkar et al. | |

\* cited by examiner

TRAIN STATUS PRESENTATION BASED ON AGGREGATED TRACKING INFORMATION

TECHNICAL FIELD

The present disclosure relates generally to a system and method for determining and presenting the status of a train and, more particularly, to a system and method for determining and presenting the position, configuration, and operational status of a train based on aggregated tracking information.

BACKGROUND

Rail vehicles may include multiple powered units, such as locomotives, that are mechanically coupled or linked together in a consist. The consist of powered units operates to provide tractive and/or braking efforts to propel and stop movement of the rail vehicle. The powered units in the consist may change the supplied tractive and/or braking efforts based on a data message that is communicated to the powered units. For example, the supplied tractive and/or braking efforts may be based on Positive Train Control (PTC) instructions or control information for an upcoming trip. The control information may be used by a software application to determine the speed of the rail vehicle for various segments of an upcoming trip of the rail vehicle.

A goal in the operation of the locomotives in a train is to provide the most accurate and up-to-date information regarding operational characteristics of the entire train and all systems and subsystems of the train to an operator located on-board or at a remote controller interface. In order to achieve the goal of providing automatic train operation (ATO), a reliable control system must be provided in order to transmit train control commands and other data indicative of operational characteristics associated with the various subsystems of the locomotive consists between the train and an off-board, remote controller interface (also sometimes referred to as the "back office"). The control system must be capable of transmitting data messages having the information used to control the tractive and/or braking efforts of the rail vehicle and the operational characteristics of the various consist subsystems while the rail vehicle is moving. The control system must also be able to transmit information regarding a detected fault on-board a locomotive, and respond with control commands to reset the fault. There is also a need for a train tracking system that determines and presents current, real-time position information for one or more trains in a railroad network, the configuration or arrangement of powered and non-powered units within each of the trains, and operational status of the various systems and subsystems of the trains that are being tracked. A user on-board a train or at a remote controller interface would benefit from being able to see a configurable virtual representation of the real-time location of the train on an electronic map, as well as the exact configuration of the train and operational status of all train assets, systems, and subsystems at any point in time.

One example of a powered system, such as a train, that includes a control system for remotely controlling speed regulation of the powered system to improve efficiency of operation of the powered system is disclosed in U.S. Pat. No. 8,989,917 of Kumar, that issued on Mar. 24, 2015 ("the '917 patent"). In particular, the '917 patent discloses a system for operating a remotely controlled powered system. The system includes feedforward and feedback elements configured to provide and receive information related to predicted and actual movement of the powered system to remotely control the speed of the system to improve efficiency of operation.

Although useful in allowing for remote control of the speed of operation of one or more locomotives in a train, the system of the '917 patent may be limited. In particular, the '917 patent does not provide a way for an operator located on-board or off-board a train to receive and manipulate information provided as a virtual representation of the real-time position, configuration, and operational status of a train and associated train assets.

The present disclosure is directed at overcoming one or more of the shortcomings set forth above and/or other problems of the prior art.

SUMMARY

In one aspect, the present disclosure is directed to a control system for presenting a configurable virtual representation of at least a portion of a train and associated train assets, including a real-time location, configuration, and operational status of the train and associated train assets traveling along a railway. The control system may include a train position determining system including at least two of a GPS device mounted on the train, an automatic equipment identification (AEI) device including a radio frequency identification (RFID) tag mounted on the train and a fixed position RFID reader positioned adjacent to the railway, a video feed capture device configured for capturing images showing the real-time position of the train, and an automatic train protection (ATP) device including an ATP reader mounted on the train and a fixed position warning signal generating device positioned adjacent to the railway. The control system may also include a train configuration determining system including at least two of an electronically controlled pneumatic braking (ECPB) system in communication with each of the train assets, an up-to-date database configured to provide real-time train and train asset scheduled deployment information, a plurality of GPS devices mounted on each of the train assets, the AEI device, and the video feed capture device. The control system may further include a train asset operational parameter sensing device, and a controller configured to receive data produced by at least two of the devices, system, and database that are included with the train position determining system and the train configuration determining system, and receive train asset operational parameter data from the train asset operational parameter sensing device. The controller may also be configured to process and aggregate the received data to provide a real-time virtual representation of the train and the train assets including the actual real-time position and configuration of the train assets relative to each other and to a geographical location, and coordinate a presentation of the aggregated data such that implementation of a select presentation process to the aggregated data results in a simultaneous implementation of the same select presentation process to at least one of electronic map data associated with the real-time location of the train and the train asset operational parameter data. A graphical user interface (GUI) may be configured to display in one or more display areas the real-time virtual representation of the train including a coordinated and configurable presentation of at least a portion of the aggregated data and the train asset operational parameter data.

In another aspect, the present disclosure is directed to a computer-implemented method of presenting a configurable virtual representation of at least a portion of a train and associated train assets, including a real-time location, configuration, and operational status of the train and associated train assets traveling along a railway. The method may include receiving, at a controller, real-time data indicative of the real-time position of the train produced by at least two of a GPS device mounted on the train, an automatic equipment identification (AEI) device including a radio frequency identification (RFID) tag mounted on the train and a fixed position RFID reader positioned adjacent to the railway, a video feed capture device configured for capturing images showing the real-time position of the train, and an automatic train protection (ATP) device including an ATP reader mounted on the train and a fixed position warning signal generating device positioned adjacent to the railway. The method may also include receiving, at the controller, real-time data indicative of the real-time configuration of the train assets in the train produced by at least two of an electronically controlled pneumatic braking (ECPB) system in communication with each of the train assets, an up-to-date database configured to provide real-time train and train asset scheduled deployment information, a plurality of GPS devices mounted on each of the train assets, the AEI device, and the video feed capture device. The method may still further include receiving, at the controller, train asset operational parameter data from a train asset operational parameter sensing device, processing and aggregating the received data with the controller to provide a real-time virtual representation of the train and the train assets including the actual real-time position and configuration of the train assets relative to each other and to a geographical location, coordinating, with the controller, a presentation on a GUI of the aggregated data such that implementation of a select presentation process to the aggregated data results in a simultaneous implementation of the same select presentation process to at least one of electronic map data associated with the real-time location of the train and the train asset operational parameter data, and displaying on the GUI in one or more display areas the real-time virtual representation of the train and the train assets including a coordinated and configurable presentation of at least a portion of the aggregated data and the train asset operational parameter data.

In yet another aspect, the present disclosure is directed to a non-transitory computer-readable storage medium storing program code operable to cause a controller and a GUI to perform operations to present a configurable virtual representation of at least a portion of a train and associated train assets on an electronic map, including a real-time location, configuration, and operational status of the train and associated train assets traveling along a railway. The operations may include receiving, at the controller, real-time data indicative of the real-time position of the train produced by at least two of a GPS device mounted on the train, an automatic equipment identification (AEI) device including a radio frequency identification (RFID) tag mounted on the train and a fixed position RFID reader positioned adjacent to the railway, a video feed capture device configured for capturing images showing the real-time position of the train; and an automatic train protection (ATP) device including an ATP reader mounted on the train and a fixed position warning signal generating device positioned adjacent to the railway. The operations may also include receiving, at the controller, real-time data indicative of the real-time configuration of the train assets produced by at least two of an electronically controlled pneumatic braking (ECPB) system in communication with each of the train assets, an up-to-date database configured to provide real-time train and train asset scheduled deployment information, a plurality of GPS devices mounted on each of the train assets, the AEI device, and the video feed capture device. The operations may further include receiving, at the controller, train asset operational parameter data from a train asset operational parameter sensing device, processing and aggregating the received data with the controller to provide a real-time virtual representation of the train and the train assets including the actual real-time position and configuration of the train assets relative to each other and to a geographical location, coordinating, with the controller, a presentation on the GUI of the aggregated data such that implementation of a select presentation process to the aggregated data results in a simultaneous implementation of the same select presentation process to at least one of electronic map data associated with the real-time location of the train and the train asset operational parameter data, and displaying on the GUI the real-time virtual representation of the train and the train assets including a coordinated and configurable presentation of at least a portion of the aggregated data and the train asset operational parameter data.

DETAILED DESCRIPTION

Figure 1:
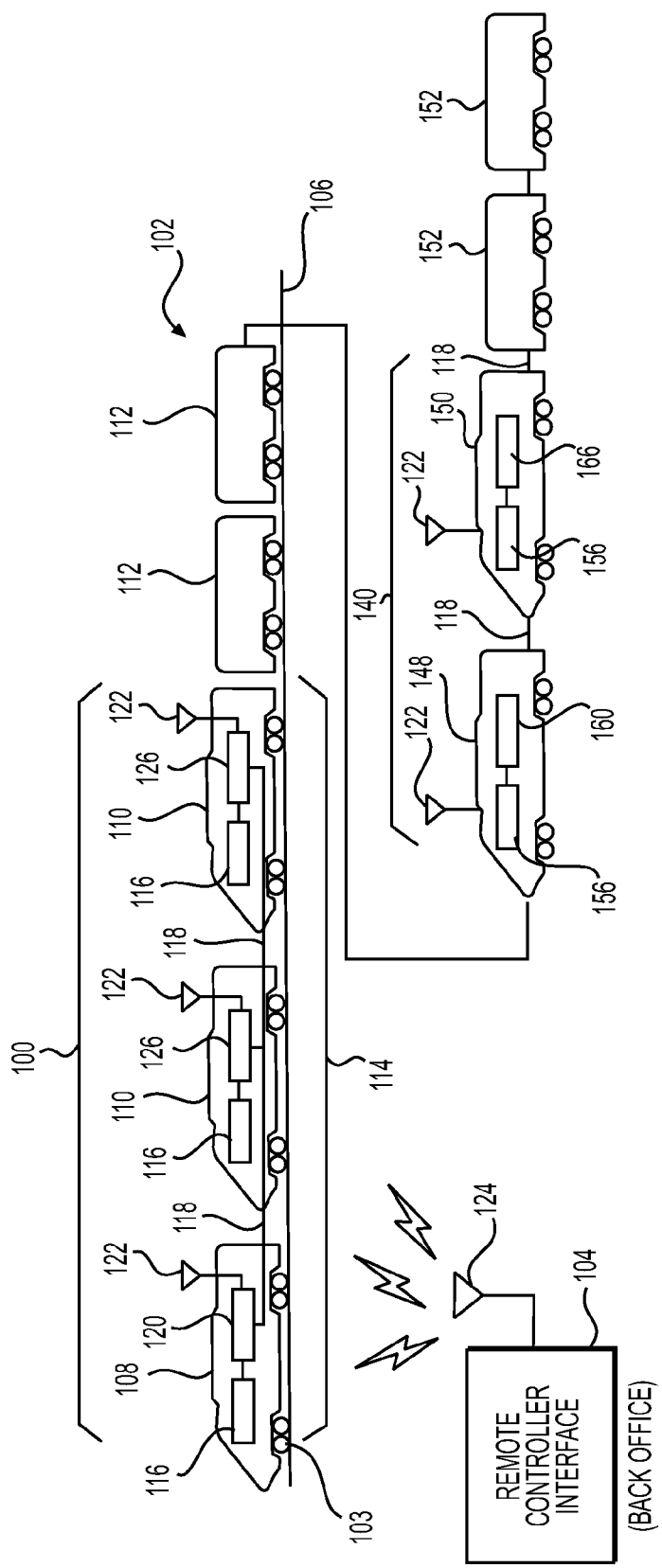
FIG. 1 is a schematic diagram of one embodiment of a control system and associated train asset.

FIG. 1 is a schematic diagram of one embodiment of a control system 100 for operating a train 102 traveling along a track 106. The train may include multiple train assets (including powered and/or non-powered rail cars or units) linked together as one or more consists or a single rail car (a powered or non-powered rail car or unit). The control system 100 may provide for cost savings, improved safety, increased availability and reliability of train assets, operational flexibility, and convenience in the control of the train 102 through communication of network data between an off-board remote controller interface 104 and the train 102. The control system 100 may also provide a means for remote operators or third party operators to communicate with the various locomotives or other powered units of the train 102 from remote interfaces that may include any computing device connected to the Internet or other wide area or local communications network. The control system 100 may be used to convey a variety of network data and command and control signals in the form of messages communicated to the train 102, such as packetized data or information that is communicated in data packets, from the off-board remote controller interface 104. The off-board remote controller interface 104 may also be configured to receive remote alerts and other data from a controller on-board the train, and forward those alerts and data to desired parties via pagers, mobile telephone, email, and online screen alerts. The data communicated between the train 102 and the off-board remote controller interface 104 may include signals indicative of various operational parameters or maintenance activities associated with components, equipment, subsystems, and systems of the train, and command and control signals operative to change the state of various circuit breakers, throttles, brake controls, actuators, switches, handles, relays, and other electronically-controllable devices on-board any locomotive or other powered unit of the train 102.

The control system 100 may also include a train asset management system. The train asset management system may include a plurality of sensors associated with components, equipment, subsystems, and systems of various assets of a train, and one or memories associated with one or more processors located on-board and/or off-board the train. Each of the plurality of sensors may be configured to generate a real-time signal indicative of at least one of a measured operational characteristic or a maintenance activity associated with a train asset. The train asset management system of control system 100 may be configured to receive the real-time signals from the sensors, and receive from one or more memories on-board or off-board the train prognostic data providing information on the likelihood a train asset will complete a mission. Prognostic data is objectively measurable data, such as the age of a particular train asset, the length of time or number of miles the asset has been in service, the length of time during which the propulsion subsystems of the asset have been operated above a threshold level of power output, the types of loads the train asset has been subjected to, the terrain and environmental conditions under which the train asset has been operated, the timing and nature of any maintenance activities performed on the asset, the particular type, make, or model of the asset, and the type of propulsion subsystem and fuel used by the asset.

The off-board remote controller interface 104 may be connected with an antenna module 124 configured as a wireless transmitter or transceiver to wirelessly transmit data messages to the train 102. The messages may originate elsewhere, such as in a rail-yard back office system, one or more remotely located servers (such as in the "cloud"), a third party server, a computer disposed in a rail yard tower, and the like, and be communicated to the off-board remote controller interface 104 by wired and/or wireless connections. Alternatively, the off-board remote controller interface 104 may be a satellite that transmits the message down to the train 102 or a cellular tower disposed remote from the train 102 and the track 106. Other devices may be used as the off-board remote controller interface 104 to wirelessly transmit the messages. For example, other wayside equipment, base stations, or back office servers may be used as the off-board remote controller interface 104. By way of example only, the off-board remote controller interface 104 may use one or more of the Transmission Control Protocol (TCP), Internet Protocol (IP), TCP/IP, User Datagram Protocol (UDP), or Internet Control Message Protocol (ICMP) to communicate network data over the Internet with the train 102. The network data can include information used to automatically and/or remotely control operations of the train 102 or subsystems of the train, and/or reference information stored and used by the train 102 during operation of the train 102. The network data communicated to the off-board remote controller interface 104 from the train 102 may also provide alerts and other operational information that allows for remote monitoring, diagnostics, train asset management as described above, and tracking of the state of health of all of the components, equipment, primary power systems and auxiliary subsystems such as HVAC, air brakes, lights, event recorders, and the like.

The train 102 may include a lead consist 114 of powered locomotives, including the interconnected powered units 108 and 110, one or more remote or trailing consists 140 of powered locomotives, including powered units 148, 150, and additional non-powered units 112, 152. "Powered units" refers to rail cars that are capable of self-propulsion, such as locomotives. "Non-powered units" refers to rail cars that are incapable of self-propulsion, but which may otherwise receive electric power for other services. For example, freight cars, passenger cars, and other types of rail cars that do not propel themselves may be "non-powered units", even though the cars may receive electric power for cooling, heating, communications, lighting, and other auxiliary functions.

In the illustrated embodiment of FIG. 1, the powered units 108, 110 represent locomotives joined with each other in the lead consist 114. The lead consist 114 represents a group of two or more locomotives in the train 102 that are mechanically coupled or linked together to travel along a route. The lead consist 114 may be a subset of the train 102 such that the lead consist 114 is included in the train 102 along with additional trailing consists of locomotives, such as trailing consist 140, and additional non-powered units 152, such as freight cars or passenger cars. While the train 102 in FIG. 1 is shown with a lead consist 114, and a trailing consist 140, alternatively the train 102 may include other numbers of locomotive consists joined together or interconnected by one or more intermediate powered or non-powered units that do not form part of the lead and trailing locomotive consists.

The powered units 108, 110 of the lead consist 114 include a lead powered unit 108, such as a lead locomotive, and one or more trailing powered units 110, such as trailing locomotives. As used herein, the terms "lead" and "trailing" are designations of different powered units, and do not necessarily reflect positioning of the powered units 108, 110 in the train 102 or the lead consist 114. For example, a lead powered unit may be disposed between two trailing powered units. Alternatively, the term "lead" may refer to the first powered unit in the train 102, the first powered unit in the lead consist 114, and the first powered unit in the trailing consist 140. The term "trailing" powered units may refer to powered units positioned after a lead powered unit. In another embodiment, the term "lead" refers to a powered unit that is designated for primary control of the lead consist 114 and/or the trailing consist 140, and "trailing" refers to powered units that are under at least partial control of a lead powered unit.

The powered units 108, 110 include a connection at each end of the powered unit 108, 110 to couple propulsion subsystems 116 of the powered units 108, 110 such that the powered units 108, 110 in the lead consist 114 function together as a single tractive unit. The propulsion subsystems 116 may include electrical and/or mechanical devices and components, such as diesel engines, electrical generators, and traction motors, used to provide tractive effort that propels the powered units 108, 110 and braking effort that slows the powered units 108, 110.

Similar to the lead consist 114, the embodiment shown in FIG. 1 also includes the trailing consist 140, including a lead powered unit 148 and a trailing powered unit 150. The trailing consist 140 may be located at a rear end of the train 102, or at some intermediate point along the train 102. Non-powered units 112 may separate the lead consist 114 from the trailing consist 140, and additional non-powered units 152 may be pulled behind the trailing consist 140.

The propulsion subsystems 116 of the powered units 108, 110 in the lead consist 114 may be connected and communicatively coupled with each other by a network connection 118. In one embodiment, the network connection 118 includes a net port and jumper cable that extends along the train 102 and between the powered units 108, 110. The network connection 118 may be a cable that includes twenty seven pins on each end that is referred to as a multiple unit cable, or MU cable. Alternatively, a different wire, cable, or bus, or other communication medium, may be used as the network connection 118. For example, the network connection 118 may represent an Electrically Controlled Pneumatic Brake line (ECPB), a fiber optic cable, or wireless connection. Similarly, the propulsion subsystems 156 of the powered units 148, 150 in the trailing consist 140 may be connected and communicatively coupled to each other by the network connection 118, such as a MU cable extending between the powered units 148, 150.

The network connection 118 may include several channels over which network data is communicated. Each channel may represent a different pathway for the network data to be communicated. For example, different channels may be associated with different wires or busses of a multi-wire or multi-bus cable. Alternatively, the different channels may represent different frequencies or ranges of frequencies over which the network data is transmitted.

The powered units 108, 110 may include communication units 120, 126 configured to communicate information used in the control operations and asset management of various components, equipment, subsystems, and systems such as the propulsion subsystems 116 of the powered units 108, 110. The communication unit 120 disposed in the lead powered unit 108 may be referred to as a lead communication unit. As described below, the lead communication unit 120 may be the unit that initiates the transmission of data packets forming a message to the off-board, remote controller interface 104. For example, the lead communication unit 120 may transmit a message via a WiFi or cellular modem to the off-board remote controller interface 104. The message may contain information on an operational state of the lead powered unit 108, such as a throttle setting, a brake setting, readiness for dynamic braking, the tripping of a circuit breaker on-board the lead powered unit, or other operational characteristics or parameters. Additionally, the communication units on each powered and non-powered unit may transmit and receive signals indicative of failures of components, and maintenance activities, such as changes in fluids, repair or replacement of components or systems, and adjustments made to various on-board components and controls. The communication units 126 may be disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112. Another lead communication unit 160 may be disposed in the lead powered unit 148 of the trailing consist 140. The lead communication unit 160 of the trailing consist 140 may be a unit that receives data packets forming a message transmitted by the off-board, remote controller interface 104. For example, the lead communication unit 160 of the trailing consist 140 may receive a message from the off-board remote controller interface 104 providing operational commands that are based upon the information transmitted to the off-board remote controller interface 104 via the lead communication unit 120 of the lead powered unit 108 of the lead consist 114. A trailing communication unit 166 may be disposed in a trailing powered unit 150 of the trailing consist 140, and interconnected with the lead communication unit 160 via the network connection 118.

The communication units 120, 126 in the lead consist 114, and the communication units 160, 166 in the trailing consist 140 may be connected with the network connection 118 such that all of the communication units for each consist are communicatively coupled with each other by the network connection 118 and linked together in a computer network. Alternatively, the communication units may be linked by another wire, cable, or bus, or be linked by one or more wireless connections.

The networked communication units 120, 126, 160, 166 may include antenna modules 122. The antenna modules 122 may represent separate individual antenna modules or sets of antenna modules disposed at different locations along the train 102. For example, an antenna module 122 may represent a single wireless receiving device, such as a single 220 MHz TDMA antenna module, a single cellular modem, a single wireless local area network (WLAN) antenna module (such as a "Wi-Fi" antenna module capable of communicating using one or more of the IEEE 802.11 standards or another standard), a single WiMax (Worldwide Interoperability for Microwave Access) antenna module, a single satellite antenna module (or a device capable of wirelessly receiving a data message from an orbiting satellite), a single 3G antenna module, a single 4G antenna module, and the like. As another example, an antenna module 122 may represent a set or array of antenna modules, such as multiple antenna modules having one or more TDMA antenna modules, cellular modems, Wi-Fi antenna modules, WiMax antenna modules, satellite antenna modules, 3G antenna modules, and/or 4G antenna modules.

As shown in FIG. 1, the antenna modules 122 may be disposed at spaced apart locations along the length of the train 102. For example, the single or sets of antenna modules represented by each antenna module 122 may be separated from each other along the length of the train 102 such that each single antenna module or antenna module set is disposed on a different powered or non-powered unit 108, 110, 112, 148, 150, 152 of the train 102. The antenna modules 122 may be configured to send data to and receive data from the off-board remote controller interface 104. For example, the off-board remote controller interface 104 may include an antenna module 124 that wirelessly communicates the network data from a remote location that is off of the track 106 to the train 102 via one or more of the antenna modules 122. Alternatively, the antenna modules 122 may be connectors or other components that engage a pathway over which network data is communicated, such as through an Ethernet connection.

The diverse antenna modules 122 enable the train 102 to receive the network data transmitted by the off-board remote controller interface 104 at multiple locations along the train 102. Increasing the number of locations where the network data can be received by the train 102 may increase the probability that all, or a substantial portion, of a message conveyed by the network data is received by the train 102. For example, if some antenna modules 122 are temporarily blocked or otherwise unable to receive the network data as the train 102 is moving relative to the off-board remote controller interface 104, other antenna modules 122 that are not blocked and are able to receive the network data may receive the network data. An antenna module 122 receiving data from the off-board device 104 may in turn re-transmit that received data to the appropriate lead communication unit 120 of the lead locomotive consist 114, or the lead communication unit 160 of the trailing locomotive consist 140. Any data packet of information received from the off-board remote controller interface 104 may include header information or other means of identifying which locomotive in which locomotive consist the information is intended for. Although the lead communication unit 120 on the lead consist may be the unit that initiates the transmission of data packets forming a message to the off-board, remote controller interface 104, all of the lead and trailing communication units may be configured to receive and transmit data packets forming messages. Accordingly, in various alternative implementations according to this disclosure, a command control signal providing operational commands for the lead and trailing locomotives may originate at the remote controller interface 104 rather than at the lead powered unit 108 of the lead consist 114.

Each locomotive or powered unit of the train 102 may include a car body supported at opposing ends by a plurality of trucks. Each truck may be configured to engage the track 106 via a plurality of wheels, and to support a frame of the car body. One or more traction motors may be associated with one or all wheels of a particular truck, and any number of engines and generators may be mounted to the frame within the car body to make up the propulsion subsystems 116, 156 on each of the powered units. The propulsion subsystems 116, 156 of each of the powered units may be further interconnected throughout the train 102 along one or more high voltage power cables in a power sharing arrangement. Energy storage devices (not shown) may also be included for short term or long term storage of energy generated by the propulsion subsystems or by the traction motors when the traction motors are operated in a dynamic braking or generating mode. Energy storage devices may include batteries, ultra-capacitors, flywheels, fluid accumulators, and other energy storage devices with capabilities to store large amounts of energy rapidly for short periods of time, or more slowly for longer periods of time, depending on the needs at any particular time. The DC or AC power provided from the propulsion subsystems 116, 156 or energy storage devices along the power cable may drive AC or DC traction motors to propel the wheels. Each of the traction motors may also be operated in a dynamic braking mode as a generator of electric power that may be provided back to the power cables and/or energy storage devices. Control over engine operation (e.g., starting, stopping, fueling, exhaust aftertreatment, etc.) and traction motor operation, as well as other locomotive controls, may be provided by way of various controls housed within a cab supported by the frame of the train 102. In some implementations of this disclosure, initiation of these controls may be implemented in the cab of the lead powered unit 108 in the lead consist 114 of the train 102. In other alternative implementations, initiation of operational controls may be implemented off-board at the remote controller interface 104, or at a powered unit of a trailing consist.

Figure 2:
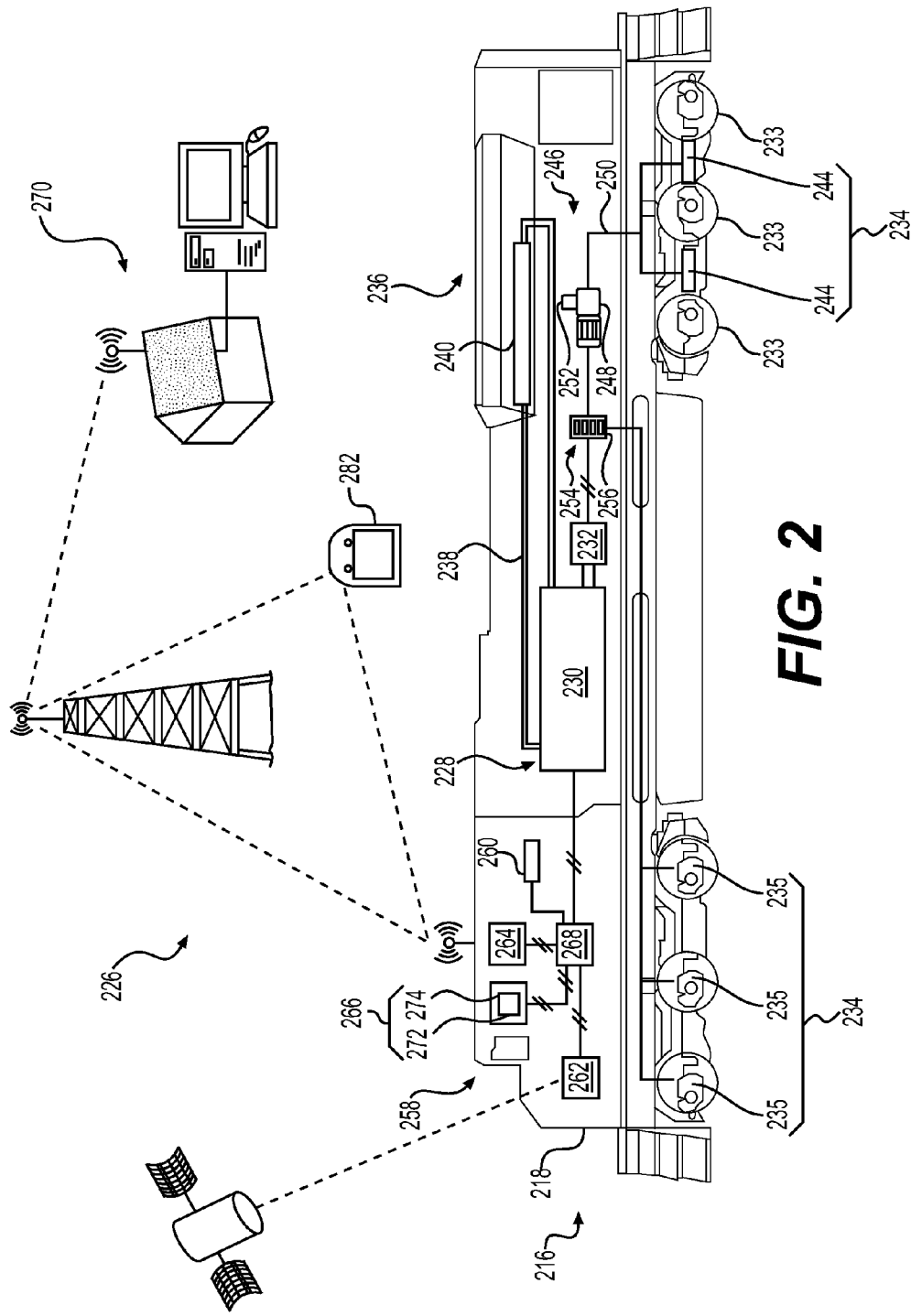
FIG. 2 is a schematic diagram of a portion of the control system and a train asset illustrated in FIG. 1.

FIG. 2 shows an exemplary train asset 216 in communication with an exemplary disclosed train asset management system 226 that may be associated with a railroad network. For the purposes of this disclosure, train asset 216 in FIG. 2 is depicted as a locomotive 218. However, it is noted that any type of train asset 216, including non-powered units such as a freight car, tanker, or other rail equipment, may be a train asset in communication with train asset management system 226.

Locomotive 218 may be a fuel-burning locomotive. For example, locomotive 218 may include an engine system 228 having one or more fuel-burning engines 230. Engine 230 may be an internal combustion engine (e.g., a piston engine or a turbine engine) configured to burn a fuel (e.g., diesel, petrol, natural gas, propane, and/or kerosene) supplied by a fuel system in order to generate a mechanical power output. The output of engine 230 may be used to drive a generator 232 (e.g., an AC generator or a DC generator) configured to supply electricity to a traction system 234 having one or more traction motors 235 for propelling locomotive 218 on a plurality of wheels 233 and axles. Engine 230 may alternatively be configured to directly drive wheels 233 with the mechanical output via drivetrain components, such as gears, clutches, torque converters, and shafts.

A cooling system 236 may be configured to actively cool engine 230 and/or other components of locomotive 218. Cooling system 236 may include, for example, fluid conduits 238 that circulate a cooling fluid (e.g., water, propylene glycol, or other coolants) between a heat source, such as engine 230 or generator 232, and a heat sink, such as a heat exchanger 240. Heat exchanger 240 may include a number of fluid passages configured to allow heated fluid therein to transfer heat to a coolant passing between or around the fluid passages. Cooling system 236 may also include one or more cooling fluid pumps, valves, fans, sensors, and/or other components.

Locomotive 218 may also include one or more brake systems configured to reduce the track speed of locomotive 218. For example, the brake systems may include one or more braking devices 244 positioned near a rotary component such as a brake disk, or a brake drum. Braking devices may include a caliper and pads, shoes and linkages, magnetic brakes, or another type of braking device. As shown in FIG. 2, braking devices 244 may be actuated by a compressed air system 246. In other embodiments, braking devices may be powered hydraulically, mechanically, a combination thereof, or by another method. Locomotive 218 may also or alternatively include other types of braking systems, such as parking brakes, auxiliary brakes, and an electronically controlled pneumatic brake (ECPB) system. The ECPB system may be configured to include an electronically controlled pneumatic (ECP) trainline that extends between and couples the locomotives with each other and with other railcars in the train. The ECP trainline may provide a communication link among the locomotives and the railcars that is used to communicate brake data between the locomotives and the railcars for brake control purposes. Each locomotive and railcar may be equipped with a ECP transceiver unit connected to the ECP trainline and configured to transmit and receive network and/or high bandwidth data, and non-network control information. The data transmitted and received by each ECP transceiver unit on each locomotive and railcar may include information verifying the presence and relative position of each locomotive and railcar relative to each other powered and non-powered unit making up the train.

Compressed air system 246 may include one or more air compressors 248 configured to pressurize air for use throughout locomotive 218. Pressurized air conduits 250 may be configured to transport pressurized air from compressor 248 to various devices within locomotive 218, such as braking devices 244 and suspension equipment. Compressor 248 may be driven by an electric motor 252 that may be powered by generator 232, a battery, or another source of electricity. In other embodiments, compressor 248 may be autonomously powered by a dedicated engine.

An electrical system 254 may supply and/or control electrical power to various electrical devices associated with locomotive 218. Electrical system 254 may supply electrical power from generator 232, a dedicated engine and generator, one or more batteries or battery banks, a connection to grid power, or another source of electricity. Electrical power may be distributed throughout electrical system 254 via one or more circuit breakers 256. For example, electricity from generator 232 may be distributed to traction motors 235 via circuit breaker 256 for propelling locomotive 218. Electrical system 254 may also power a control system 258 and/or other electronic control devices. Electrical system 254 may include additional circuit breakers, fuses, receptacles, lights, and other components.

Control system 258 may include one or more components associated with manual and/or automatic control of locomotive 218. For example, control system 258 may include the train asset management system in accordance with various implementations of this disclosure. Control system 258 may also include one or more sensors 260, a locating device 262, a communication device 264, a user interface 266, an on-board central processing module (CPM) 268, and operational control devices in communication with each of the other components. Additional and/or other components of control system 258 may be included, if desired. Components of control system 258 may be configured to communicate by wired (e.g., dedicated wire, multi-unit (MU) cable, local area network (LAN), controller area network (CAN), and wide area network (WAN)) and/or wireless (e.g., WiFi, Bluetooth, cellular, satellite, and RFID) connections. Communication device 264 may include a wireless modem, a locomotive interface gateway (LIG), and other communication components required for processing, modulating, transmitting, and receiving wireless signals.

Sensors 260 may be positioned throughout locomotive 218 and other assets 216 of a train. Sensors 260 may each be configured to generate a signal indicative of an operating parameter and/or an operational status of an associated system, subsystem, equipment, and/or component of locomotive 218. Sensors 260 may be configured to generate signals indicative of, for example, temperature, pressure, position, current, voltage, presence (e.g., via optical sensors, cameras, and proximity sensors), air flow, fuel flow, exhaust constituents, air/fuel ratio, and light intensity. One or more sensors 260 may be associated with each of the systems, subsystems, equipment, and/or components of locomotive 218. Signals generated by sensors 260 may also be indicative of an operational status of sensors 260 themselves and/or their associated systems, subsystems, equipment, and/or components. For example, the integrity, strength, and/or nature of the signals generated by sensors 260 may be indicative of whether the respective sensor and/or associated systems, subsystems, and/or components are functioning properly. Various sensors 260 may also be configured to transmit signals indicative of any maintenance activities performed on the various systems, subsystems, equipment, and/or components on-board a train asset. Signals from sensors 260 may be communicated to CPM 268 for further processing.

Locating device 262 may be configured to determine and communicate an absolute and/or relative geographic location of locomotive 218. For example, locating device 262 may include a Global Positioning System (GPS) transponder configured to receive position signals from one or more GPS satellites, an Inertial Reference Unit (IRU), or any other locating device known in the art. Locating device 262 may communicate the positioning signals and/or other information to CPM 268 for further processing.

Communication device 264 may include any device configured to facilitate communications between CPM 268 and off-board entities, such as an off-board remote controller interface 270. Communication device 264 may include hardware and/or software such as the LIG that enables communication device 264 to process, modulate, send and/or receive data messages through a wireless communication link. Communication device 264 may be configured to communicate via wireless communication platforms, such as by satellite, cellular, infrared, Bluetooth, WiFi, and/or other wireless communication platforms. Communication device 264 may also or alternatively be configured to communicate via a local area network (LAN) or another type of wired network that enables CPM 268 to exchange information with off-board entities.

User interface 266 may be located inside an operator station of locomotive 218, and may include a data entry module 272 for manually receiving data from an operator and a display 274 for displaying information to the operator. Data entry module 272 may include a keyboard, mouse, touchscreen, directional pad, selector buttons, or any other suitable features for recording manually entered data. User interface 266 may also include one or more operational control devices for controlling operations of locomotive 218. For example, user interface 266 may include a throttle control, an automatic brake control, an independent brake handle, a generator switch, a lighting control, and/or other controls. Operational control devices may embody levers, knobs, switches, buttons, slides, handles, touch screens, soft keys, and/or other types of controls. User interface 266 may also be configured to allow the operator to engage or communicate with train and/or train asset control systems. That is, information and requests for input from one or more controllers or control systems may be shown to the operator via display 274, and the operator may provide responses and/or other input via data entry module 272. Inputs entered via data entry module may be communicated to CPM 268 for further processing.

Off-board remote controller interface 270 may represent one or more computing systems associated with a railroad network, a localized control station, wayside equipment, or other train assets 216 such as locomotive 218. Off-board remote controller interface 270 may be configured to allow a user to engage a control system associated with multiple trains and/or train assets 216 in a railroad network. Information and requests for input from one or more train and/or train asset control systems may be shown to the user via off-board remote controller interface 270. Off-board remote controller interface 270 may also be configured to allow a user to provide responses and/or other inputs to train and/or train asset control systems. Off-board remote controller interface 270 may be further configured to store periodically updated on-board equipment operational data and data related to maintenance activities received from CPM 268, perform comparisons between samples of data received from CPM 268 and the latest data stored on off-board remote controller interface 270, and send updates for data to CPM 268 when the data stored at off-board remote controller interface 270 is more up-to-date than samples of data received from CPM 268. Off-board remote controller interface 270 may embody, for example, one or more of a laptop computer, a work station, a personal digital assistant, a mainframe, a cellular phone, a tablet, a computerized accessory, and/or other computing systems known in the art.

Figure 3:
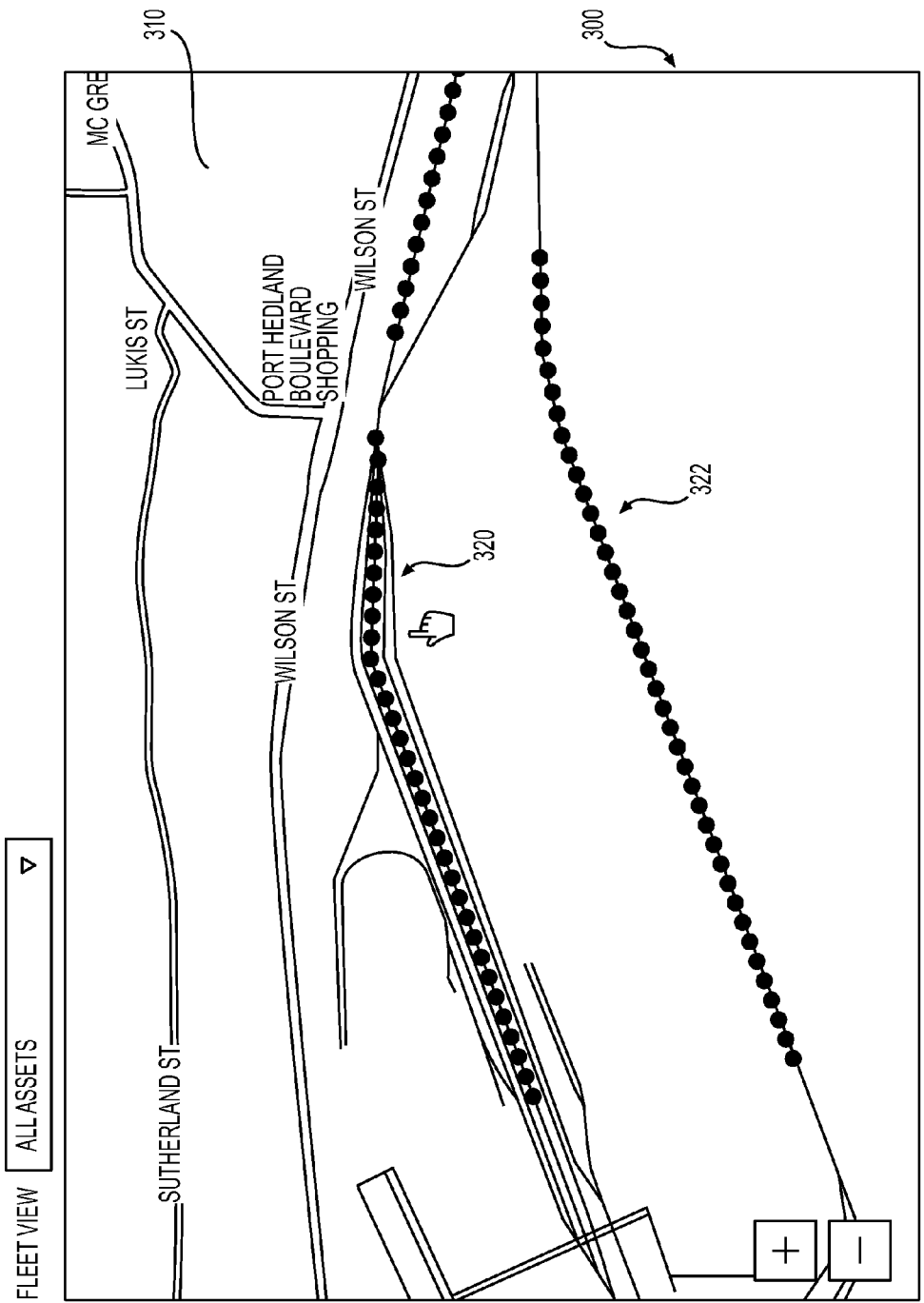
FIGS. 3-5 are graphical representations of exemplary disclosed graphical user interfaces (GUI) that may be used in conjunction with the control system illustrated in FIG. 1.
Figure 4:
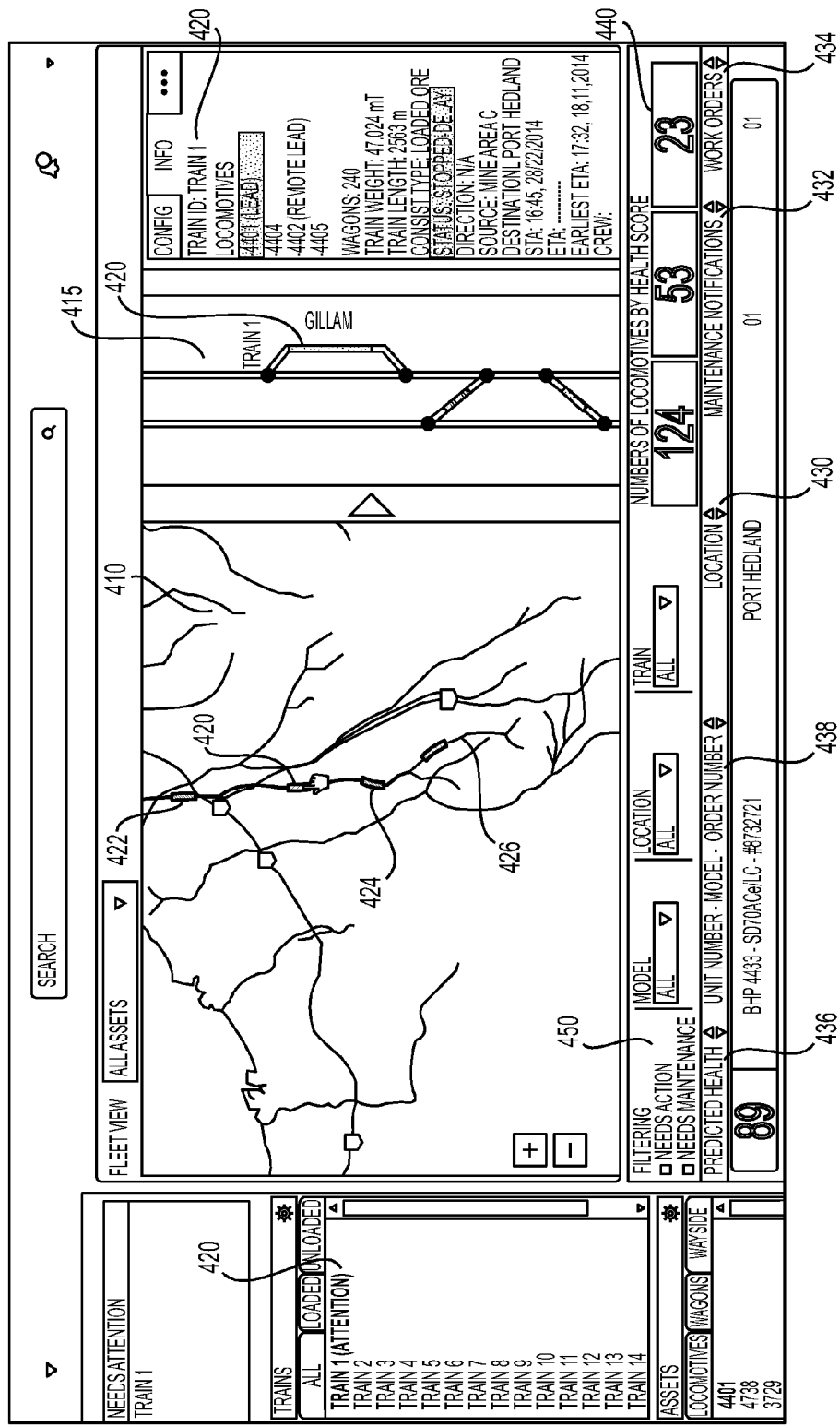
Figure 5:
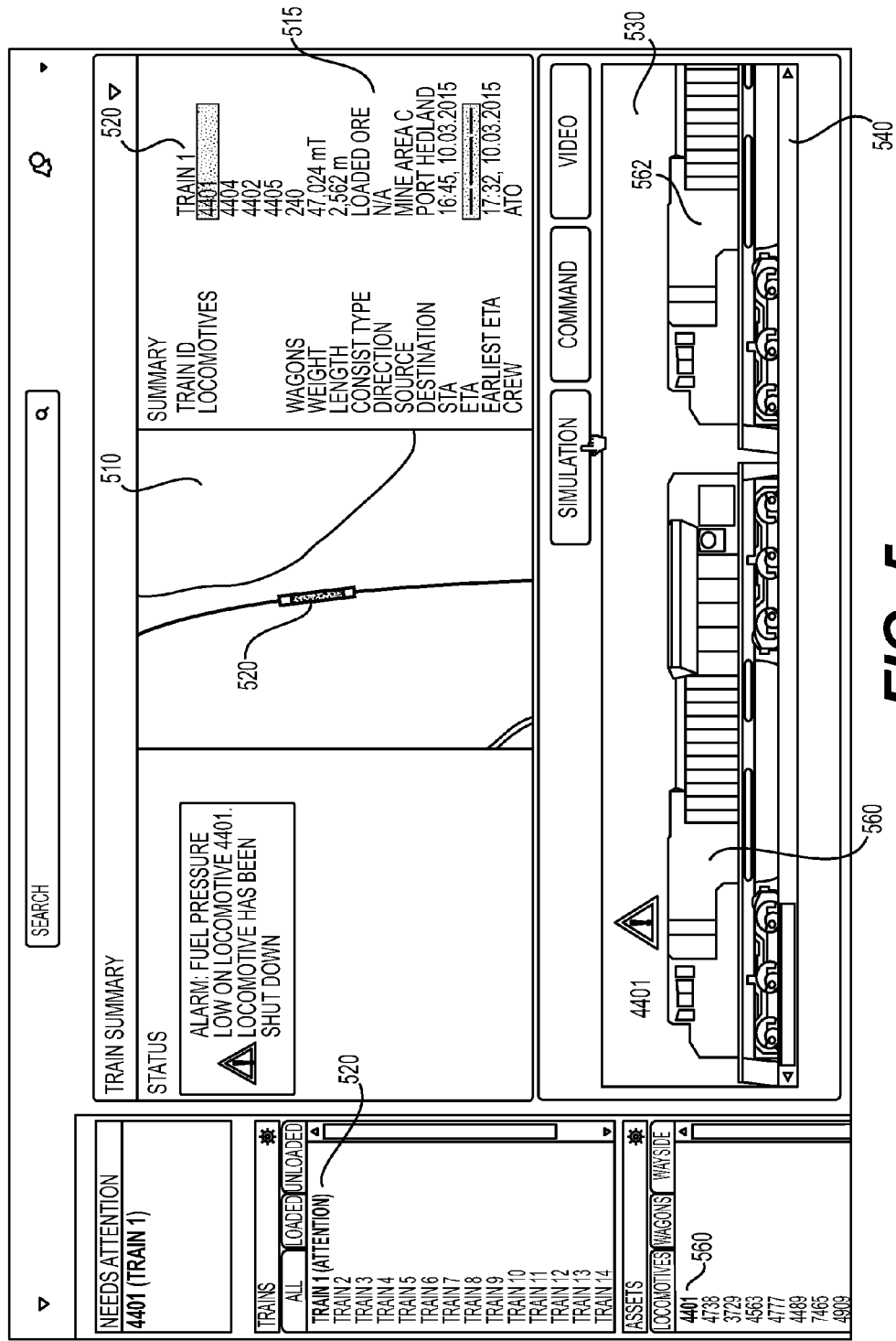

FIGS. 3-5 are graphical representations of an exemplary disclosed graphical user interface (GUI) 300 configured to display one or more trains 320, 322 in a railroad network, showing the location of each of the displayed trains in real-time on an electronic map 310. Each train displayed on GUI 300 as the train travels along a section of railway within a particular geographic region may include multiple rail cars (including powered and/or non-powered rail cars or units) linked together as one or more consists, or a single rail car (a powered or non-powered rail car or unit).

During operation of each asset of a train, an on-board or off-board control system may continually receive signals from sensors. The on-board or off-board control system may then analyze the signals to determine an operational status of the sensors and/or the components or subsystems they monitor. For example, a control system may compare the integrity of the signals to the integrity thresholds contained in fault code table(s) stored in memories associated with the control system. If the control system retrieves a fault code from the table(s), which may mean that at least one component has failed, the control system may retrieve the diagnostic information stored in a database about the failed component. The control system may then display this information on a user interface on-board the train or off-board the train at a remote controller interface (e.g., back office) via a graphical user interface (GUI) 300, as shown in FIGS. 3-5.

To determine the position and configuration of a train at any point in time, the control system associated with the GUI, either on-board the train or off-board at the remote controller interface, may be configured to acquire data from a plurality of different sources. Some of the sources of data may enable the control system to determine the position of one or more trains, and other sources of data may enable the controller to determine the train configuration. The train configuration is the arrangement of locomotives and other rail cars as they are linked together in a train at any particular time.

The control system may be configured for presenting a configurable virtual representation of at least a portion of a train and associated train assets, including a real-time location, configuration, and operational status of the train and associated train assets traveling along a railway. The control system may be configured to include a train position determining system. The train position determining system may include a GPS device mounted on the train, an automatic equipment identification (AEI) device including a radio frequency identification (RFID) tag mounted on the train and a fixed position RFID reader positioned adjacent to the railway, a video feed capture device configured for capturing images showing the real-time position of the train, and an automatic train protection (ATP) device including an ATP reader mounted on the train and a fixed position warning signal generating device positioned adjacent to the railway. The train position determining system may include at least two of the above-described devices so that the data obtained from two or more different sources may be aggregated in order to provide redundancy, reliability, and timeliness of the acquired data. The control system may also be configured to aggregate the data acquired from different sources and interpolate train position at times in between when data is actually received from any of the sources using any of a variety of statistical analysis methods such as Kalman filtering. The control system may be configured to predict future train position and configuration based on pre-recorded data, identified trends in movement of the train, physics-based algorithms, and other methods.

The control system may also be configured to include a train configuration determining system including at least two of an electronically controlled pneumatic braking (ECPB) system in communication with each of the train assets, an up-to-date database configured to provide real-time train and train asset scheduled deployment information, a plurality of GPS devices mounted on each of the train assets, the AEI device, and the video feed capture device. The train configuration determining system, like the train position determining system, may include at least two of the above-described devices so that the data obtained from two or more different sources may be aggregated by the control system in order to provide redundancy, reliability, and timeliness of the acquired data. Aggregation of the data acquired from both the train position determining system and the train configuration determining system may also reduce the response time for determining and updating the real-time position and configuration of a train and the train assets in the train.

The control system may be further configured to receive operational data from one or more train asset operational parameter sensing devices, as well as from at least two of the devices, system, and database that are included with the train position determining system and the train configuration determining system. The control system may process and aggregate the received data to provide a real-time virtual representation of the train and the train assets including the actual real-time position and configuration of the train assets relative to each other and to a geographical location. The control system may be configured to coordinate a presentation of the aggregated data such that implementation of a select presentation process to the aggregated data results in a simultaneous implementation of the same select presentation process to at least one of electronic map data associated with the real-time position of the train and the train asset operational parameter data. An exemplary implementation of the GUI, as shown in FIGS. 3-5, may be configured to display in one or more display areas the real-time virtual representation of the train including a coordinated and configurable presentation of at least a portion of the aggregated data and the train asset operational parameter data. The control system may be further configured to process real-time and pre-recorded data by using tagged metadata comprising a universal time stamp associated with the real-time and pre-recorded data to synchronize the data.

The control system 226, including an on-board controller 268 or off-board remote controller interface 270 and an associated GUI 300, may be further configured to coordinate the presentation of the aggregated data to provide the real-time virtual representation of the train and the train assets relative to at least one of a geographical feature or man-made infrastructure presented on an electronic map in one or more display areas of the GUI. The controller and the GUI may be configured to modify the display of the real-time virtual representation of the train to display only a selected portion of the train including one or more train assets selected on the display by a user. The modified real-time virtual representation of the selected portion of the train may be displayed in a separate display area from a display area including a real-time virtual representation of the train superimposed on an electronic map.

The controller and the GUI may be further configured to coordinate the presentation of the selected portion of the train with a presentation of at least a portion of the aggregated data and the train asset operational parameter data associated with the selected portion of the train. A presentation of the selected portion of the train in a first display area of the GUI may be coordinated with the presentation of the train asset operational parameter data in a separate, second display area of the GUI.

The controller 226 and the GUI 300 may be still further configured to coordinate the presentation of the aggregated data such that implementation of a select presentation process to the aggregated data includes scrolling at least a portion of the real-time virtual representation of the train in a display area 530 of the GUI 300 in order to display successive train assets in accordance with the actual real-time configuration of the assets in the train. Accurate and continually available train position and train configuration data for display on the GUI may be further enabled by the control system interpolating at least one of a predicted real-time position and a predicted real-time configuration of the train assets relative to each other and to a geographical location in between receiving data from the train position determining system and the train configuration determining system. The interpolation of data may include implementing statistical analysis of previously received and pre-recorded train position and configuration data. Multiple future states of train position and/or configuration may be predicted through statistical analysis such as Kalman filtering of a number of past states. The result may be prediction of a new state along with a confidence level in the prediction based on factors such as the length of time since the controller received an updated measurement of train position and/or configuration.

The possible sources of data indicative of train position may include the GPS sensor 262 placed on a locomotive 218 or any other train asset 216 to determine the train's position relative to various geographical and infrastructure features. A signal from a GPS sensor on a single train asset may be used as representative of the location of the entire train, or multiple signals from GPS sensors spaced along the train may be averaged or otherwise combined to provide the location of the train. When coupled with train configuration information, the position of a single train asset may be used to determine the positions of every other asset within the train.

Another indicator of train position may be provided by signals from the automatic equipment identification (AEI) devices, such as radio frequency identification (RFID) tags mounted on rail cars, etc. RFID reading units positioned at wayside stations may be configured to interrogate and obtain information from RFID tags mounted on a passing train. As a train passes the wayside station RFID reading unit, the reader scans and interprets identification information associated with the passing train asset. The controller receiving signals from the AEI devices can determine the position of a train asset including a RFID tag when the asset passes by the RFID reading unit by combining information on the time a signal was generated by the reading unit, and the position of the reading unit.

The Automatic train protection (ATP) devices may include balises, beacons, transponders, antennas, dragging equipment detectors, wheel temperature sensors, hot box detectors, or other sensors mounted on sleeper ties or wayside equipment. The ATP devices may provide signals that may be used to identify the position of a train or train asset at any particular time. A reader on a train asset receiving a signal from an ATP device may be able to determine the position of the asset including the reader at the time of communication with the ATP device based on the known location of the ATP device. A successful communication with the fixed ATP device may provide a very accurate indication of the position of the train asset as a result of a limited reading range for a signal transmitted by the ATP device.

Video feeds and images taken of a passing train asset may also be received by a controller on-board or off-board the train and analyzed for time and position information to determine the locations of passing train assets. The video imagers may be installed as wayside equipment at fixed geographical locations or included on other train assets such that their fields of view may capture passing train assets.

In addition to signals indicative of a train or train asset position at any particular time, information regarding the configuration of a train may also be received at an on-board or off-board controller. The configuration of a train may be useful for determining exactly where a particular locomotive or rail car is located within a train. The electronically-controlled pneumatic braking (ECPB) system on a train may provide a source of information for determining and tracking the configuration of a train. The ECPB system has the ability to communicate with each of the assets included in a train so that signals can be sent to each asset for actuation of the air brakes on the asset. As a result, the ECPB system can provide signals indicative of whether a particular asset is present in the train as well as the ordering of the assets along the train. Information from the ECPB system, along with train scheduling information identifying deployed trains and train assets, and information obtained from the GPS, AEI, ATP, and imaging devices discussed above can all be used to determine a train configuration. The information on train position and configuration may be aggregated in order to increase the confidence level in a determined position and configuration. In particular, when any one or more data sources are unavailable (e.g., out of range, out of service, or not supported along a particular length of track), information from any of the other available sources may still be available. Aggregation of the data from the multiple sources may also reduce response time for determining or updating a determined train position or configuration. For example, some sources of information (e.g., GPS or AEI) may provide information useful for determining location and configuration only at certain periodic or even sporadic times or rates. The controller may rely on data received from one or more of the other sources to fill in the gaps and update position and configuration information more regularly than a single source may allow.

Referring to FIGS. 3-5, GUI 300 may be a software tool including menus (e.g., drop-down menus), modules, buttons, toolbars, and other means to facilitate the conveyance and transfer of information to/from a user and an off-board remote controller interface 270 and/or on-board controller 268. The GUI 300 may require user authentication, such as, for example, a username, a password, a pin number, an electromagnetic passkey, etc. The GUI 300 may include one or more display areas showing data and/or virtual representations of trains in a railroad network superimposed on an electronic map 310. In FIG. 3, a virtual representation of each of the trains 320, 322 is presented on the map 310, showing in real-time the actual location of each of the trains relative to surrounding geographical features and man-made infrastructure. Depending on the size of display area available on a particular device, the virtual representation of each train may be simple markings on an electronic map (such as the dots shown in FIG. 3), schematic illustrations of various train assets, simplified visual representations of train assets, or actual video footage of the trains taken with video cameras, for example, from unmanned aerial vehicles (UAV) or stationary wayside assets. Geographical features and infrastructure such as tunnels through mountains or under waterways, bridges over waterways, roads, rail yards, factories, shopping centers, residential neighborhoods, etc. may be identified on the display in the area encompassing the location of one or more trains in a railroad network at any particular time. Additional display areas, such as the display areas shown on the left-hand and right-hand sides of FIGS. 4 and 5, may show data and/or visual representations of one or more selected trains and/or assets associated with each train. Display areas may further show diagnostic information relating to selected trains and/or assets.

As shown in FIG. 4, the main display area of the GUI may include an electronic map 410 of a railroad network. The electronic map 410 may be, for example, a two-dimensional or a three-dimensional graphical representation of a railroad network, with locations of tracks 426, trains 420, 422, 424, and geographical features and infrastructure marked on the representation. The on-board controller or off-board remote controller interface including the GUI may be configured to automatically generate and/or update the representation of the railroad network, including the locations of the trains, in real-time during operation of the trains. The representations presented on the GUI may be based on the data received from the one or more sources of train position and configuration data discussed above. The on-board controller or off-board remote controller interface may also be configured to allow the operator of the railroad network to directly modify the electronic map 410 and/or to select display parameters from available parameters stored in RAM and/or ROM associated with the controller. The modifications and/or display parameters may additionally or alternatively be automatically implemented and/or selectable based on modes of railroad operation, if desired.

In some implementations, the electronic map 410 may visually indicate an operational status of each train 420, 422, 424 in a railroad network. Each train may be displayed with a different visual indicator on the electronic map 410 depending on its operational status. For example, one train 420 experiencing at least one fault condition may be displayed with solid shading, while other trains 422, 424, experiencing normal conditions may be shown with cross-hatch shading. FIG. 4 is only one exemplary implementation of a GUI visually indicating the operational status of each train in a railroad network. In some alternative implementations, the electronic map may associate a different color with each train depending on its operational status. For example, if a train 420 is experiencing at least one fault condition, the train 420 may be shown in red. Or, if a train has a risk of experiencing at least one fault condition but is not currently experiencing at least one fault condition, the train may be shown in yellow. Further, if a train is experiencing normal conditions, the train may be shown in blue. The electronic map 410 may alternatively associate other known visual indicators with trains to help the operator to identify the operational status of each train on the electronic map.

Additional display areas, such as the display area 415 in FIG. 4 may provide a virtual representation of the area immediately surrounding a particular train 420 that is selected by a user in the main display area of the GUI. Yet another display area 450 in FIG. 4 may include one or more selectable lists or drop-down menus to allow the user to selectively display certain information on the electronic map 410. Various selectable parameters may include the location of interest 430, maintenance notifications 432, work orders 434, predicted health 436 (or likelihood a train asset will be able to complete a mission), and a unit number/model number/order number 438. An additional display area 440 may provide the numbers of locomotives in a train or in a railroad network by health scores. As another example, the display area on the left-hand side of the GUI in FIG. 4 may include a selectable train list and a selectable train assets list. As also shown in FIG. 4, a user may select, for example, TRAIN 1 from the train list and LOCOMOTIVE 4401 from the train asset list in order to modify one or more display areas on the GUI to display the train 420 and the locomotive on the electronic map 410.

As shown in FIG. 5, upon selection of a particular train 520, the main display area of the GUI may only show as much of the railroad network and surrounding geographical map as necessary to show the location of the selected train. The lower display area 530 in FIG. 5 may then display a virtual representation of a portion of the train with visually accurate representations of the selected train assets, such as the lead locomotive 560, and a trailing locomotive 562. The lower display area 530 may also include a scroll bar 540 that allows a user to scroll through the visual representation of the train in the actual order and configuration of train assets. In some implementations, a user may also be able to "grab" the visual representation of the train and drag left or right to move the representation of the train left or right.

In some implementations, a "needs attention" list may also be provided in a display area (as shown in the upper left-hand corner of the GUI in FIGS. 4 and 5) to show which of the selected trains and/or assets may require the user's attention. The lists of trains and train assets may show every train and train asset associated with a railroad network. The user may select one or more trains in the train list. By selecting a particular train 520 in the train list, the selected train 520 may either be displayed or hidden from the electronic map 510. Thus, the user may filter which trains are shown on the electronic map 510.

The assets list may show each asset associated with a particular train. For example, the assets list may include any number of locomotives, wagons, and/or wayside equipment that are associated with a particular train. By selecting a particular asset in the assets list, the user may cause the controller to either display or hide the selected asset on the electronic map 510. Thus, the user may also filter which assets (e.g., locomotives) are shown on the electronic map.

The "needs attention" list may show any trains and/or assets that may require the user's attention. For example, the attention list may display any trains and/or assets that are currently experiencing at least one fault condition. In particular, by using the information compiled from various sensors on-board a locomotive, in sleeper ties, or on other wayside equipment, a controller on-board or off-board the train may determine that a particular train has one or more assets that are currently experiencing at least one fault condition. Accordingly, these trains and/or assets may be displayed on the attention list to draw the user's attention to the trains and/or assets experiencing fault conditions. For example, as shown in FIG. 5, if a controller determines that "TRAIN 1" 520 has one or more assets (locomotive 4401) 560 experiencing at least one fault condition, "4401 (TRAIN 1)" may be displayed in the attention list. The user may then be able to select the respective train and/or asset on the attention list to show more information about the particular train and/or assets in other display areas.

In some implementations, by selecting a particular train from the train list or the attention list, a display area of the GUI may show data relating to the selected train in the train data display area 515 on the right-hand side of the GUI. The data may be extracted from a database accessed by the controller. As shown in FIG. 5, the data may include, for example, a train identification ("Train ID"), a list of locomotives associated with the train, the number of wagons associated with the train, the overall weight of the train, the overall length of the train, the consist type associated with the train, the direction of the train, the source of the train, the destination of the train, the estimated time of arrival ("ETA") of the train, and/or a crew associated with the train. FIG. 5 illustrates an exemplary set of data displayed relating to the selected train at one moment in time, however, the information in train data region 515 may be updated in real-time, via the controller. In addition, by selecting the particular train from the trains list or the attention list, the display area may show all of the assets associated with the selected train in the assets list.

The GUI may be configured such that clicking on a particular train displayed on the electronic map 510 may result in the display area showing a warning region displaying one or more fault conditions associated with the selected train. The warning region may include one or more warning messages corresponding to the one or more fault conditions associated with the assets on the selected train. For example, as shown in FIG. 5, the warning message may read "ALARM: FUEL PRESSURE LOW ON LOCOMOTIVE 4401, LOCOMOTIVE HAS BEEN SHUT DOWN". This message may alert the operator to the particular asset on the selected train that is experiencing the fault condition, in order to allow the operator to make appropriate decisions for maintenance and repair of that particular asset. The warning region may also include one or more visual indicators to alert the user of the fault condition. As illustrated in FIG. 5, the visual indicator may be in the form of a warning triangle. However, other known visual indicators may alternatively be used to alert the user to the fault condition.

In some implementations of this disclosure, by clicking on a particular warning message and/or visual indicator displayed in the warning region, the display area may show a two-dimensional or a three-dimensional graphical representation of the asset experiencing the fault condition. For example, as shown in FIG. 5, the graphical representation may show the asset and all of its associated components. The graphical representation may include a visual indicator associated with one or more components on the asset that are experiencing the fault condition. For example, if the fuel pressure is low on the particular asset, as described above, a component associated with that warning may be visually indicated on the graphical representation. If the fuel pressure is low, the fuel tank of the asset may be highlighted to alert the operator to that particular component of the asset. Other components associated with a fault condition, such as a fuel pump, fuel injectors, and/or engine cylinders, may also be highlighted to alert the operator to those components as well. The user may also scroll the train to the left or the right in the lower display area 530 using scroll bar 540 in order to check locomotives or rail cars adjacent to an asset associated with a fault condition. In situations when a fault condition is associated with one or more sensors that typically provide train position or train configuration information, the methods in accordance with the present disclosure of aggregating data from a plurality of position and configuration sensors may still allow prompt and accurate location of where the fault condition is occurring.

One skilled in the art will recognize that the processes illustrated in this description may be implemented in a variety of ways and include other modules, programs, applications, scripts, processes, threads, or code sections that may all functionally interrelate with each other to accomplish the individual tasks described above for each module, script, and daemon. For example, the programs modules configured for presenting the virtual representations of trains and associated train assets may be implemented using a variety of commercially available software tools. Various implementations may use custom object-oriented code written in the C++ programming language, applets written in the Java programming language, or may be implemented with discrete electrical components or as one or more hardwired application specific integrated circuits (ASIC) that are custom designed for this purpose.

An exemplary computer-implemented method of presenting a configurable virtual representation of at least a portion of a train and associated trains asset in accordance with various aspects of this disclosure is described in more detail in the following section.

INDUSTRIAL APPLICABILITY

A configurable virtual representation of at least a portion of a train and associated train assets may be determined and displayed on a GUI from an aggregation of train position and train configuration data obtained from multiple sources. The data may include a real-time location, configuration, and operational status of the train and associated train assets traveling along a railway. A controller on-board or off-board the train may receive real-time data indicative of the real-time position and configuration of the train. As discussed above, the data may be generated by at least two of a GPS device mounted on the train, an automatic equipment identification (AEI) device including a radio frequency identification (RFID) tag mounted on the train and a fixed position RFID reader positioned adjacent to the railway, a video feed capture device configured for capturing images showing the real-time position of the train, and an automatic train protection (ATP) device including an ATP reader mounted on the train and a fixed position warning signal generating device positioned adjacent to the railway. The controller may also receive real-time data indicative of the real-time configuration of the train assets generated by at least two of an electronically controlled pneumatic braking (ECPB) system in communication with each of the train assets, an up-to-date database configured to provide real-time train and train asset scheduled deployment information, a plurality of GPS devices mounted on each of the train assets, the AEI device, and the video feed capture device.

The controller may also receive train asset operational parameter data from a train asset operational parameter sensing device, and process and aggregate the received data to provide a real-time virtual representation of the train and the train assets including the actual real-time position and configuration of the train assets relative to each other and to a geographical location. The controller may coordinate a presentation on the GUI of the aggregated data such that implementation of a select presentation process to the aggregated data results in a simultaneous implementation of the same select presentation process to at least one of electronic map data associated with the real-time location of the train and the train asset operational parameter data.

The GUI may display in one or more display areas the real-time virtual representation of the train and the train assets including a coordinated and configurable presentation of at least a portion of the aggregated data and the train asset operational parameter data. Various features on the GUI may enhance the ability of a user to derive useful, actionable information from the various display areas. Various types of data received by the controller and presented on the GUI may be synchronized by at least one common attribute, such as a time stamp, associated with the types of data. During viewing of real-time data being presented by the GUI, a virtual representation of multiple trains in a railroad network, a single train in the network, and/or one or more train assets may be coordinated and synchronized with a presentation of data associated with selected portions of the representation on the GUI. Coordinated presentations of select portions of the synchronized and associated data may enhance the ability to predict, investigate, and determine the exact causes or contributing factors for different faults or operational issues.

The GUI may provide a configurable virtual representation of one or more trains and/or train assets by implementing modifications to one or more displays based on inputs received from a user. As discussed above, selection of a particular train and/or asset highlighted on a display area of the GUI may result in an expanded view of the selection as well as presentation of associated operational data. A select presentation process that may be performed by the controller and the GUI may include zooming in or out on a geographical area including a particular train or train asset of interest. A user may also determine the exact configuration of a selected train, as shown in FIG. 5, by moving a scrollbar 540 left or right in order to move the display of a plurality of train assets left or right in display area 530. A controller associated with the GUI may implement the simultaneous scrolling of GPS electronic map data displayed in another display area, and operational parameters associated with the assets being displayed. This feature allows an operator to make a selection of an asset of interest based on any one of several different displays of synchronized data presented on the GUI. The selection may be based on a highlighted train or train asset, a warning indicator (as shown in FIG. 5), or any other observation of an operational parameter that is unusual, a tabulated value that is outside an expected range, or video footage that is unusual.

The initial scale at which the electronic map data is presented in the main display area of the GUI may not allow for detailed viewing of any particular train or train asset at a point in time. This may be the result of presenting an entire railroad network on a limited display area. A user may find it desirable to zoom in on a relatively short section of railway to view details and operating parameters associated with only one or two train assets, as well as view the specific grade or other geographical features or infrastructure at that location. During an investigation of an event or anomaly associated with certain trains or train assets, a user may select a specific train or train asset in the main display area, and then move the scrollbar 540 until spotting a warning indicator or a significant spike in the presentation of operational data that may be indicative of a factor contributing to the cause of the event.

The presentation of real-time and/or pre-recorded train position data, train configuration data, and associated operational data may be based on an associated common attribute. This synchronization may be enabled by having associated a common attribute such as a universal time stamp with each of the types of data as the data is generated by the various sources of data, or received and processed by the controller. Other common attributes may include proximity to a common landmark or other geographical position when the different types of data are generated, processed, and/or recorded. Identifying information such as one or more of these common attributes may be tagged or associated with real-time data or pre-recorded data as metadata. The controller may coordinate presentation of at least a portion of the data such that implementation of a select presentation process such as scrolling a virtual representation of a plurality of locomotives in display area 530 results in the simultaneous implementation of the same select animation process to another of the presentations of data.

It will be apparent to those skilled in the art that various modifications and variations can be made to the control system and method of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A control system for presenting a configurable virtual representation of at least a portion of a train and associated train assets, including a real-time location, configuration, and operational status of the train and associated train assets traveling along a railway, the control system comprising:
  a train position determining system including at least two of a GPS device mounted on the train, an automatic equipment identification (AEI) device including a radio frequency identification (RFID) tag mounted on the train and a fixed position RFID reader positioned adjacent to the railway, a video feed capture device configured for capturing images showing the real-time position of the train, and an automatic train protection (ATP) device including an ATP reader mounted on the train and a fixed position warning signal generating device positioned adjacent to the railway;
  a train configuration determining system including at least two of an electronically controlled pneumatic braking (ECPB) system in communication with each of the train assets, an up-to-date database configured to provide real-time train and train asset scheduled deployment information, a plurality of GPS devices mounted on each of the train assets, the AEI device, and the video feed capture device;
  a train asset operational parameter sensing device; and
  a controller configured to:
  receive data produced by at least two of the devices, system, and database that are included with the train position determining system and the train configuration determining system;
  receive train asset operational parameter data from the train asset operational parameter sensing device;
  process and aggregate the received data to provide a real-time virtual representation of the train and the train assets including the actual real-time position and configuration of the train assets relative to each other and to a geographical location;
  coordinate a presentation of the aggregated data such that implementation of a select presentation process to the aggregated data results in a simultaneous implementation of the same select presentation process to at least one of electronic map data associated with the real-time position of the train and the train asset operational parameter data; and
  a graphical user interface (GUI) configured to display in one or more display areas the real-time virtual representation of the train including a coordinated and configurable presentation of at least a portion of the aggregated data and the train asset operational parameter data.

2. The control system of claim 1, wherein the controller is further configured to process real-time and pre-recorded data by using tagged metadata comprising a universal time stamp associated with the real-time and pre-recorded data to synchronize the data.

3. The control system of claim 1, wherein the controller and the GUI are further configured to coordinate the presentation of the aggregated data providing the real-time virtual representation of the train and the train assets relative to at least one of a geographical feature or man-made infrastructure presented on an electronic map in one or more display areas of the GUI.

4. The control system of claim 1, wherein the controller and the GUI are further configured to modify the display of the real-time virtual representation of the train to display only a selected portion of the train including one or more train assets selected on the display by a user.

5. The control system of claim 4, wherein the controller and the GUI are further configured to display the modified real-time virtual representation of the selected portion of the train in a separate display area from a display area including a real-time virtual representation of the train superimposed on an electronic map.

6. The control system of claim 4, wherein the controller and the GUI are further configured to coordinate the presentation of the selected portion of the train with a presentation of at least a portion of the aggregated data and the train asset operational parameter data associated with the selected portion of the train.

7. The control system of claim 6, wherein the controller and the GUI are further configured to coordinate a presentation of the selected portion of the train in a first display area of the GUI with the presentation of the train asset operational parameter data in a separate, second display area of the GUI.

8. The control system of claim 1, wherein the controller and the GUI are further configured to coordinate the presentation of the aggregated data such that implementation of a select presentation process to the aggregated data includes scrolling at least a portion of the real-time virtual representation of the train in a display area of the GUI in order to display successive train assets in accordance with the actual real-time configuration of the assets in the train.

9. The control system of claim 1, wherein the controller is further configured to interpolate at least one of a predicted real-time position and a predicted real-time configuration of the train assets relative to each other and to a geographical location in between receiving data from the train position determining system and the train configuration determining system by implementing statistical analysis of previously received and pre-recorded train position and configuration data.

10. A computer-implemented method of presenting a configurable virtual representation of at least a portion of a train and associated train assets, including a real-time location, configuration, and operational status of the train and associated train assets traveling along a railway, the method comprising:
receiving, at a controller, real-time data indicative of the real-time position of the train produced by at least two of:
a GPS device mounted on the train;
an automatic equipment identification (AEI) device including a radio frequency identification (RFID) tag mounted on the train and a fixed position RFID reader positioned adjacent to the railway;
a video feed capture device configured for capturing images showing the real-time position of the train; and
an automatic train protection (ATP) device including an ATP reader mounted on the train and a fixed position warning signal generating device positioned adjacent to the railway;
receiving, at the controller, real-time data indicative of the real-time configuration of the train assets produced by at least two of:
an electronically controlled pneumatic braking (ECPB) system in communication with each of the train assets;
an up-to-date database configured to provide real-time train and train asset scheduled deployment information;
a plurality of GPS devices mounted on each of the train assets;
the AEI device; and
the video feed capture device;
receiving, at the controller, train asset operational parameter data from a train asset operational parameter sensing device;
processing and aggregating the received data with the controller to provide a real-time virtual representation of the train and the train assets including the actual real-time position and configuration of the train assets relative to each other and to a geographical location;
coordinating, with the controller, a presentation on a GUI of the aggregated data such that implementation of a select presentation process to the aggregated data results in a simultaneous implementation of the same select presentation process to at least one of electronic map data associated with the real-time location of the train and the train asset operational parameter data; and
displaying on the GUI in one or more display areas the real-time virtual representation of the train and the train assets including a coordinated and configurable presentation of at least a portion of the aggregated data and the train asset operational parameter data.

11. The computer-implemented method of claim 10, further including:
processing real-time and pre-recorded data by using tagged metadata comprising a universal time stamp associated with the real-time and pre-recorded data to synchronize the data.

12. The computer-implemented method of claim 10, further including coordinating the presentation of the aggregated data providing the real-time virtual representation of the train and the train assets relative to at least one of a geographical feature or man-made infrastructure presented on an electronic map in the one or more display areas of the GUI.

13. The computer-implemented method of claim 10, further including modifying a display of the real-time virtual representation of the train to display only a selected portion of the train including one or more train assets selected on the display by a user.

14. The computer-implemented method of claim 13, further including displaying the modified real-time virtual representation of the selected portion of the train in a separate display area from a display area including a real-time virtual representation of the train superimposed on an electronic map.

15. The computer-implemented method of claim 13, further including coordinating the presentation of the selected portion of the train with a presentation of at least a portion of the aggregated data and the train asset operational parameter data associated with the selected portion of the train.

16. The computer-implemented method of claim 13, further including coordinating a presentation of the selected portion of the train in a first display area of the GUI with the presentation of the train asset operational parameter data in a separate, second display area of the GUI.

17. The computer-implemented method of claim 10, further including coordinating the presentation of the aggregated data such that implementation of a select presentation process to the aggregated data includes scrolling at least a portion of the real-time virtual representation of the train in a display area of the GUI in order to display successive train assets in accordance with the actual real-time configuration of the assets in the train.

18. The computer-implemented method of claim 10, further including interpolating at least one of a predicted real-time position and a predicted real-time configuration of the train assets relative to each other and to a geographical location in between receiving the real-time data by implementing statistical analysis of previously received and recorded train position and configuration data.

19. A non-transitory computer-readable storage medium storing program code operable to cause a controller and a GUI to perform operations to present a configurable virtual representation of at least a portion of a train and associated train assets on an electronic map, including a real-time location, configuration, and operational status of the train and associated train assets traveling along a railway, the operations comprising:
  receiving, at the controller, real-time data indicative of the real-time position of the train produced by at least two of:
  a GPS device mounted on the train;
  an automatic equipment identification (AEI) device including a radio frequency identification (RFID) tag mounted on the train and a fixed position RFID reader positioned adjacent to the railway;
  a video feed capture device configured for capturing images showing the real-time position of the train; and
  an automatic train protection (ATP) device including an ATP reader mounted on the train and a fixed position warning signal generating device positioned adjacent to the railway;
  receiving, at the controller, real-time data indicative of the real-time configuration of the train assets produced by at least two of:
  an electronically controlled pneumatic braking (ECPB) system in communication with each of the train assets;
  an up-to-date database configured to provide real-time train and train asset scheduled deployment information;
  a plurality of GPS devices mounted on each of the train assets;
  the AEI device; and
  the video feed capture device;
  receiving, at the controller, train asset operational parameter data from a train asset operational parameter sensing device;
  processing and aggregating the received data with the controller to provide a real-time virtual representation of the train and the train assets including the actual real-time position and configuration of the train assets relative to each other and to a geographical location;
  coordinating, with the controller, a presentation on the GUI of the aggregated data such that implementation of a select presentation process to the aggregated data results in a simultaneous implementation of the same select presentation process to at least one of electronic map data associated with the real-time location of the train and the train asset operational parameter data; and
  displaying on the GUI the real-time virtual representation of the train and the train assets including a coordinated and configurable presentation of at least a portion of the aggregated data and the train asset operational parameter data.

20. The non-transitory computer-readable storage medium of claim 19, the operations further including coordinating the presentation of the aggregated data such that implementation of a select presentation process to the aggregated data includes scrolling at least a portion of the real-time virtual representation of the train in a display area of the GUI in order to display successive train assets in accordance with the actual real-time configuration of the assets in the train.

* * * * *